United States Patent
Chantriaux et al.

(10) Patent No.: US 9,499,277 B2
(45) Date of Patent: Nov. 22, 2016

(54) AIRCRAFT COMPRISING A DISTRIBUTED ELECTRIC POWER UNIT WITH FREE WHEELS

(76) Inventors: Eric Chantriaux, Aix-en-Provence (FR); Pascal Chretien, Oxley (AU)

(*) Notice: Subject to any disclaimer, the term of this patent is extended or adjusted under 35 U.S.C. 154(b) by 243 days.

(21) Appl. No.: 14/342,401

(22) PCT Filed: Aug. 13, 2012

(86) PCT No.: PCT/FR2012/051892
§ 371 (c)(1),
(2), (4) Date: Mar. 3, 2014

(87) PCT Pub. No.: WO2013/030489
PCT Pub. Date: Mar. 7, 2013

(65) Prior Publication Data
US 2014/0203739 A1    Jul. 24, 2014

(30) Foreign Application Priority Data

Sep. 4, 2011 (FR) .................................... 11 57829

(51) Int. Cl.
*H02P 27/00* (2006.01)
*B64D 35/02* (2006.01)
(Continued)

(52) U.S. Cl.
CPC ............. *B64D 35/02* (2013.01); *B64C 27/14* (2013.01); *B64D 27/24* (2013.01); *B64D 35/08* (2013.01); *H02K 16/00* (2013.01); *H02P 4/00* (2013.01);
(Continued)

(58) Field of Classification Search
CPC ............. H02P 5/74; H02P 4/00; H02P 27/00
USPC .......................................... 318/139, 34, 558
See application file for complete search history.

(56) References Cited

U.S. PATENT DOCUMENTS 5,054,716 A    10/1991 Wilson
7,007,897 B2 *  3/2006 Wingett ................ B64C 13/50
                                                    244/227

(Continued)

FOREIGN PATENT DOCUMENTS

CA          2230270        10/1999
DE      20 2008 002249      4/2008
(Continued)

OTHER PUBLICATIONS

International Search Report, Mar. 28, 2013, from International Phase of the instant application.

*Primary Examiner* — David S Luo
(74) *Attorney, Agent, or Firm* — Pearl Cohen Zedek Latzer Baratz LLP

(57) ABSTRACT

An aircraft comprising rotors and/or propellers rotated by a shaft and including a power unit. The distributed electric power unit is formed by stacked electric power elements, each conferring, on the shaft, a fraction of the total power necessary; the distributed electric power unit is in direct engagement with the shaft, with no movement transmission mechanism inserted between the unit and the shaft; each electric power element is directly connected to the rotation shaft and comprises a fixed stator, a moving rotor and a mechanical or electromagnetic free wheel in direct engagement with the shaft, said moving rotor co-operating with the free wheel to be coupled to the rotation shaft during normal operation of the electric power unit and to be disconnected from the shaft in the event of the failure of the electric element.

13 Claims, 4 Drawing Sheets

(51) Int. Cl.
*B64C 27/14* (2006.01)
*B64D 27/24* (2006.01)
*B64D 35/08* (2006.01)
*H02K 16/00* (2006.01)
*H02P 4/00* (2006.01)
*H02P 5/74* (2006.01)
*B60K 6/383* (2007.10)
*B64C 27/04* (2006.01)
*H02K 7/14* (2006.01)

(52) U.S. Cl.
CPC ............... *H02P 5/74* (2013.01); *H02P 27/00* (2013.01); *B60K 6/383* (2013.01); *B64C 27/04* (2013.01); *H02K 7/14* (2013.01); *H02K 2213/06* (2013.01); *H02K 2213/12* (2013.01); *Y02T 50/44* (2013.01); *Y02T 50/64* (2013.01)

(56) References Cited

U.S. PATENT DOCUMENTS

| | | | |
|---|---|---|---|
| 7,494,094 B2 * | 2/2009 | Good | ............... B64C 3/50 244/215 |
| 2009/0145998 A1 | 6/2009 | Salyer | |
| 2010/0253168 A1 | 10/2010 | Herrmann | |

FOREIGN PATENT DOCUMENTS

| | | |
|---|---|---|
| DE | 20 2007 006976 U1 | 9/2008 |
| DE | 10 2008 014404 | 10/2009 |
| DE | 10 2008 014404 A1 | 10/2009 |
| EP | 2 148 066 A1 | 1/2010 |
| FR | 2 957 207 A1 | 9/2011 |
| JP | 2002 153027 A | 5/2002 |
| KR | 20040018612 | 3/2004 |

* cited by examiner

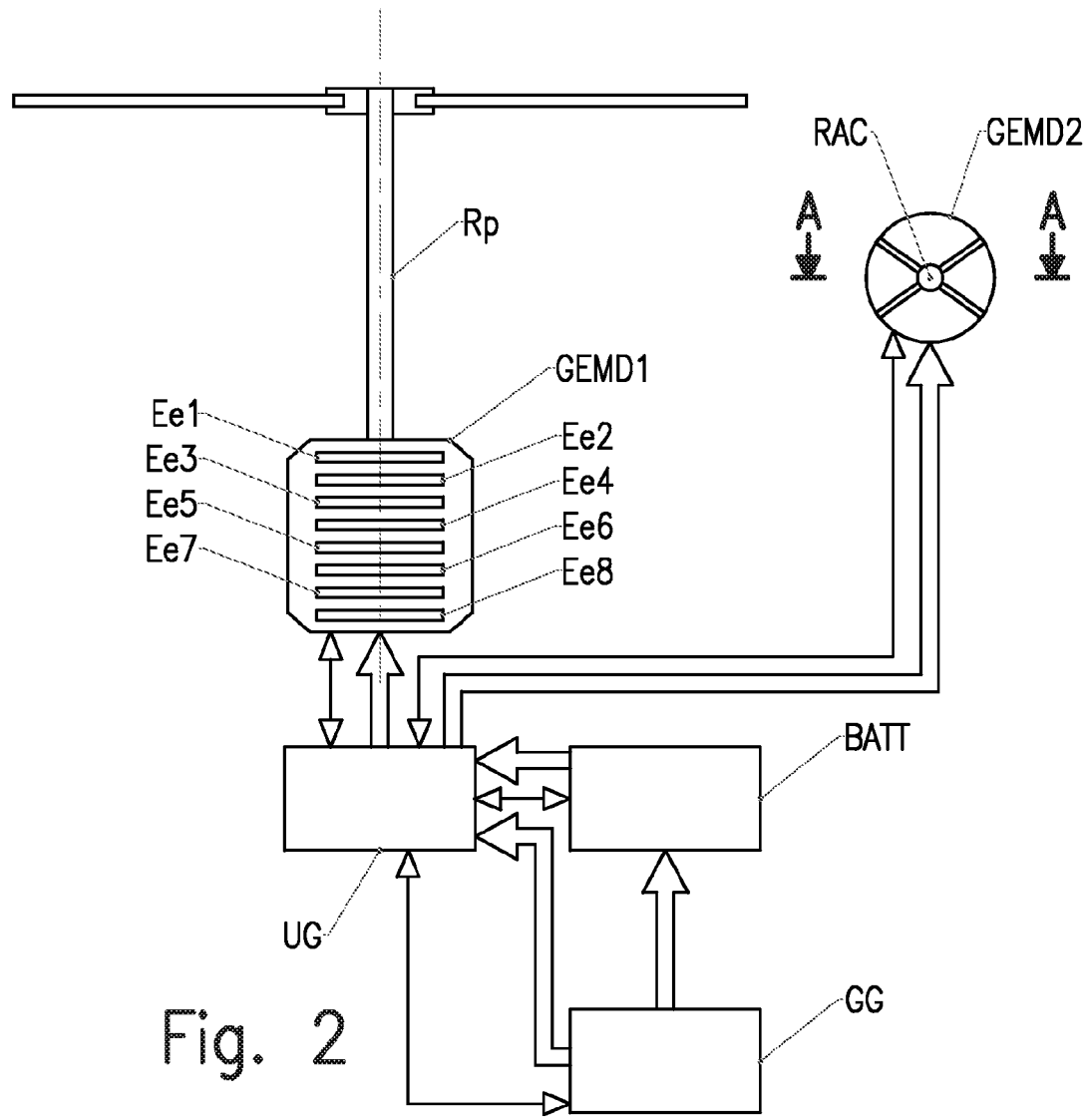
Fig. 2
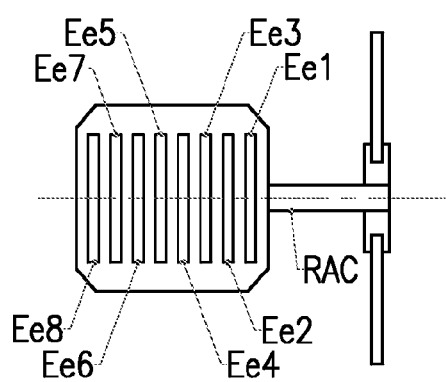
Fig. 3 (A-A)

AIRCRAFT COMPRISING A DISTRIBUTED ELECTRIC POWER UNIT WITH FREE WHEELS

CROSS REFERENCE TO RELATED APPLICATIONS

This application is a National Phase Application of PCT International Application No. PCT/FR2012/051892, entitled "AIRCRAFT COMPRISING A DISTRIBUTED ELECTRIC POWER UNIT WITH FREE WHEELS," International Filing Date Aug. 13, 2012, published on Mar. 7, 2013 as International Publication No. WO/2013/030489, which in turn claims priority from prior French application 1157829 filed on Sep. 4, 2011, all of which are incorporated herein by reference.

TECHNICAL FIELD OF THE INVENTION

The subject matter of the invention is a rotary- or fixed-wing aircraft equipped with a distributed electromagnetic transmission unit composed of a stack of electric motor elements, each producing a fraction of the total power necessary for the setting in rotation of a rotor shaft, each said electric motor element being fitted with a freewheeling unit.

The invention relates to the technical field of electromagnetic power transmissions applied to aircraft having fixed wings (airplanes) or rotary wings (helicopters), regardless of whether these are piloted or not (for example: drones).

STATE OF THE ART

Traditional propulsion systems for aircraft generally consist of a thermal engine or turboshaft engines or turbo-fan engines and a mechanical reduction gearbox coupled to the rotor shaft. Reduction gears are currently used:
- in helicopters, for transmitting the mechanical torque produced by the one or more engines or turboshaft engines driving the one or more rotors (main and/or rear rotor). This brings about a shift from a high speed of rotation (typically 30,000 rev/min for a turbine) to a low speed on the rotor shaft (in the range between 500 and 300 rev/min for ordinary helicopters).
- in airplanes, the engines or turboshaft engines driving the airscrews (or rotors).

It should be noted that the mechanical transmission gearboxes that are installed in modern machines are supposed to be capable of withstanding 30 minutes of flight without lubrication in the event of fracture of the casing, on condition that flying takes place at reduced power, which in the best case involves aborting the mission and, in unfortunately frequent cases, the loss of the aircraft and its crew as a consequence of the premature disintegration of the mechanical assemblies in flight. The ability to withstand ballistic impacts is fundamental on the battlefield. In summary, the aircraft and its crew may be lost in the event of the failure of the mechanical reduction gear. As a general rule, the consequences are therefore dramatic.

Previously disclosed in patent document CA 2.230.270 (MARTEL) is a multi-motorized shaft permitting a plurality of engines to be used in a single aircraft. Each engine is capable of producing the whole of the total power necessary for the propulsion of the aircraft. This device permits the remaining engine to be used in the event of the breakdown of one of the engines. The output shaft from each engine is offset from the airscrew shaft, however, and a complex system of pulleys and clutches ensures the transfer of energy. Not only does this system of propulsion necessitate a relatively large physical size, because the engine assembly is over-dimensioned for the envisaged redundancy, but it also does not offer optimal safety in the event of the failure of the pulleys and the clutches.

Patent document KR 2004.0018612 (KOREA AEROSPACE) describes a propulsion system permitting the reactivity of the machine to be improved by detecting the status of the said system rapidly and accurately with a propulsion controller. This system comprises: an energy generation unit; a generator; a pack of batteries; two electric motors operated by a driver. The electric motors are not included in a distributed architecture, in which each one produces a fraction of the total power necessary for the propulsion of the aircraft, each of the said motors being entirely independent. Here again, this propulsion system does not offer optimal safety in the event of the failure of one of the motors.

Patent document US 2009/0145998 (SALYER) describes a hybrid propulsion system for aircraft, and in particular for helicopters. This system comprises: an energy generation unit; a generator; an electric motor, the rotor of which is coaxial with the main rotor of the helicopter; a pack of batteries capable on their own of supplying the electric motor. The safety of the aircraft would no longer be adequately assured in the event of the failure of the electric motor.

Patent document U.S. Pat. No. 5,054,716 (WILSON) describes a propulsion system for aircraft of the "tilt rotor" type. A separate motor is associated with each of the rotors. A transmission mechanism permits the rotors to be connected to one another in such a way that, in the event of the failure of one of the motors, the remaining motor will be capable of transmitting the mechanical energy to the two rotors. The safety of the aircraft would no longer be assured, however, in the event of the failure of the transmission mechanism.

Document DE 10 2008 014404 (SWISS UAV GMBH) discloses an aircraft without a human pilot comprising a power plant of hybrid design. An internal combustion engine drives an alternator generating an electric current. The latter supplies an electric motor providing the primary power plant and/or buffer batteries. The electric motor may also be supplied with the current provided by the buffer batteries. A transmission mechanism composed of a clutch and a 90° angular gear unit is interposed between the shaft of the electric motor and the rotating shaft of the rotor. The safety of the aircraft would no longer be assured in the event of the failure of this transmission mechanism.

Document DE 20 2008 002249 U1 (DILL HANS DIETER) also discloses an aircraft comprising a power plant of hybrid design (electric motor and internal combustion engine). A transmission mechanism composed of gear wheels is interposed between the shaft of the electric motor and the rotating shaft of the rotor. The safety of the aircraft would no longer be assured in the event of the failure of this transmission mechanism.

Given this situation, the principal aim of this invention is to increase the reliability of the transmission assembly, while significantly reducing its physical size, weight and maintenance costs.

DISCLOSURE OF THE INVENTION

The invention relates to a rotary- or fixed-wing aircraft comprising one or more rotors and/or one or more propellers, in which the rotor(s) and/or propeller(s) are rotated at a variable or constant speed by at least one shaft (Rp1, Rp2, Rp, RAC, H), and the aircraft includes a power unit (GEMD) configured to propel and/or lift the aircraft by rotating the shaft. The aircraft is characterised in that: the power unit (GEMD) is a distributed electric power unit formed by multiple stacked electric power elements (Ee1, Ee2, Een), each element being adapted to confer, on the rotation shaft (Rp1, Rp2, Rp, RAC, H), a fraction of the total power necessary in order to propel and/or lift the aircraft; the distributed electric power unit (GEMD) is in direct engagement with the rotation shaft (Rp1, Rp2, Rp, RAC, H), with no movement transmission mechanism being inserted between the unit and the shaft; each electric power element (Ee1, Ee2, Een) is directly connected to the rotation shaft (Rp1, Rp2, Rp, RAC, H) and comprises at least one fixed stator (St), at least one moving rotor (Rt) and at least one mechanical or electromagnetic free wheel (RI) in direct engagement with the rotation shaft, said moving rotor (Rt) co-operating with the free wheel (RI) such as to be coupled to the rotation shaft during normal operation of the electric power unit (Ee1, Ee2, Een) and to be disconnected from the shaft in the event of the failure of the electric power element; and the rotation shafts of the moving rotors (Rt), the free wheels (RI) and the rotation shaft (Rp1, Rp2, Rp, RAC, H) are coaxial.

The solution proposed by the invention is a rotary- or fixed-wing aircraft comprising one or a plurality of rotors and/or one or a plurality of airscrews, the one or more rotors and/or the one or more airscrews being caused to rotate at a variable or constant speed by means of at least one shaft, said aircraft comprising an electromagnetic transmission unit configured to ensure the propulsion and/or the lifting of said aircraft by causing said shaft to rotate.

This aircraft is notable in that:
the transmission unit is a distributed electromagnetic transmission unit composed of a plurality of stacked electric motor elements, each said element being able to produce, on the rotating shaft, a fraction of the total power required for the propulsion and/or the lift of said aircraft,
the electromagnetic transmission unit is directly connected to the rotating shaft, without any movement transmission mechanism between said unit and said shaft,
each electric motor element is connected directly to the rotating shaft and comprises at least one fixed stator, at least one moving rotor and at least one mechanical or electromagnetic freewheeling unit directly connected to said rotating shaft, said moving rotor cooperating with said freewheeling unit in such way as to be coupled to said rotating shaft during normal operation of the electric motor element and to decouple from said shaft when said electric motor element fails,
the axes of rotation of the moving rotors, freewheeling units and rotating shaft are coaxial.

Given that the distributed electromagnetic transmission unit is in direct connection with the rotating shaft, the mechanical systems used until now are completely eliminated, thereby reducing the physical size in relation to the motor units that are familiar from the prior art and considerably increasing the reliability of the transmission chain. Furthermore, the stacked architecture of the electric motor elements associated with the judicious integration of freewheeling units actually within said elements makes it possible, in the event of damage to one of the said elements, to continue to transmit sufficient power to the rotating shaft in complete safety. The ability to withstand ballistic impacts is fundamental in the battlefield, and the invention offers this improvement.

For the purpose of reducing further the size of each electric motor element, each freewheeling unit is preferably coplanar with the moving rotor with which it is associated.

The freewheeling units are advantageously set in such way as to provide angular synchronization of all the mobile rotors of the electric motor elements during the starting phase of the electromagnetic transmission unit.

The electric motor elements are preferably physically separated and insulated one from the other, each electric motor element being inserted into a dedicated housing.

According to a further advantageous feature of the invention, the stack of electric motor elements consists of a number of fixed stators that is different from or equal to the number of moving rotors.

An electronic control unit is advantageously associated with a means for the continuous monitoring of the integrity of each electric motor element and, in the event of the failure of one or a plurality of electric motor elements, the electronic control unit is preferentially configured to emit an instruction making it possible to:
reconfigure in real time all the electric motor elements by adding, if necessary, one or more reserve electric motor elements,
or reconfigure in real time the power delivered by each electric motor element so that the distributed electromagnetic transmission unit continues to transmit sufficient power to the rotating shaft.

Advantageously, the aircraft consists of:
an energy generation unit intended to produce electrical energy, said unit being associated with a means for distributing said energy,
a means for storing the electrical energy produced by the generation unit,
the distributed electromagnetic transmission unit being supplied with electrical energy via a power controller:
by the means for storing electrical energy,
and/or by the generation unit.

The electrical energy storage means may be composed advantageously of a pack of batteries and/or supercapacitors.

The electrical energy generation unit is preferably composed of a thermochemical generator, or a thermoelectric generator, or a radio-isotopic generator, or fuel cells, or a turboshaft engine or an internal combustion engine equipped with an internal linear or rotating generator or operating an external generator.

An electronic control unit is advantageously configured to control the operating point of the distributed electromagnetic transmission unit according to the power requirement of said aircraft.

The aircraft may comprise an electronic control unit configured to control the supply to the distributed electromagnetic transmission unit, said control unit comprising a program containing:
instructions for supplying the distributed electromagnetic transmission unit solely with the electrical energy produced by the generation unit,
instructions for supplying the distributed electromagnetic transmission unit solely with the electrical energy stored in the storage means,
instructions for supplying the distributed electromagnetic transmission unit by combining the electrical energy produced by the generation unit with the electrical energy stored in the storage means.

According to yet another advantageous feature of the invention, the aircraft may comprise:
- a means for controlling the operating state of the generation unit,
- an electronic control unit configured to control the supply to the distributed electromagnetic transmission unit, said unit comprising a program containing instructions for supplying said distributed electromagnetic transmission unit solely with the electrical energy stored in the storage means, in the event of the failure of the generation unit.

The aircraft may also comprise an electronic control unit configured to control the supply of the distributed electromagnetic transmission unit, said control unit comprising a program containing instructions for supplying said electromagnetic transmission unit solely with the electrical energy stored in the storage means and, where appropriate, instructions for simultaneously stopping the function of the generation unit. This is particularly advantageous in order to suppress any infrared signature of the aircraft.

DESCRIPTION OF THE FIGURES

Other advantages and features of the invention will be more readily appreciated by reading the following description of a preferred embodiment, with reference to the accompanying drawings, which are provided by way of indicative and non-limitative example, in which:

FIG. 2 depicts the arrangement of two propulsion devices according to the invention for distributed propulsion on the main rotor and the anti-torque rotor of a conventional helicopter, FIG. 3 is a view in section along A-A showing the arrangement of the distributed electromagnetic transmission unit at the anti-torque rotor of the helicopter in FIG. 2.

In the figures, the double arrows represent the power, and the single arrows represent the exchanged data.

EMBODIMENTS OF THE INVENTION

The propulsion device according to the invention is applicable primarily to redundant distributed electric propulsion, applied to aircraft having rotary wings (helicopters) or fixed wings (airplanes), piloted or not (drones), comprising one or a plurality of airscrews and/or one or a plurality of rotors that are caused to rotate by at least one shaft.

Figure 1:
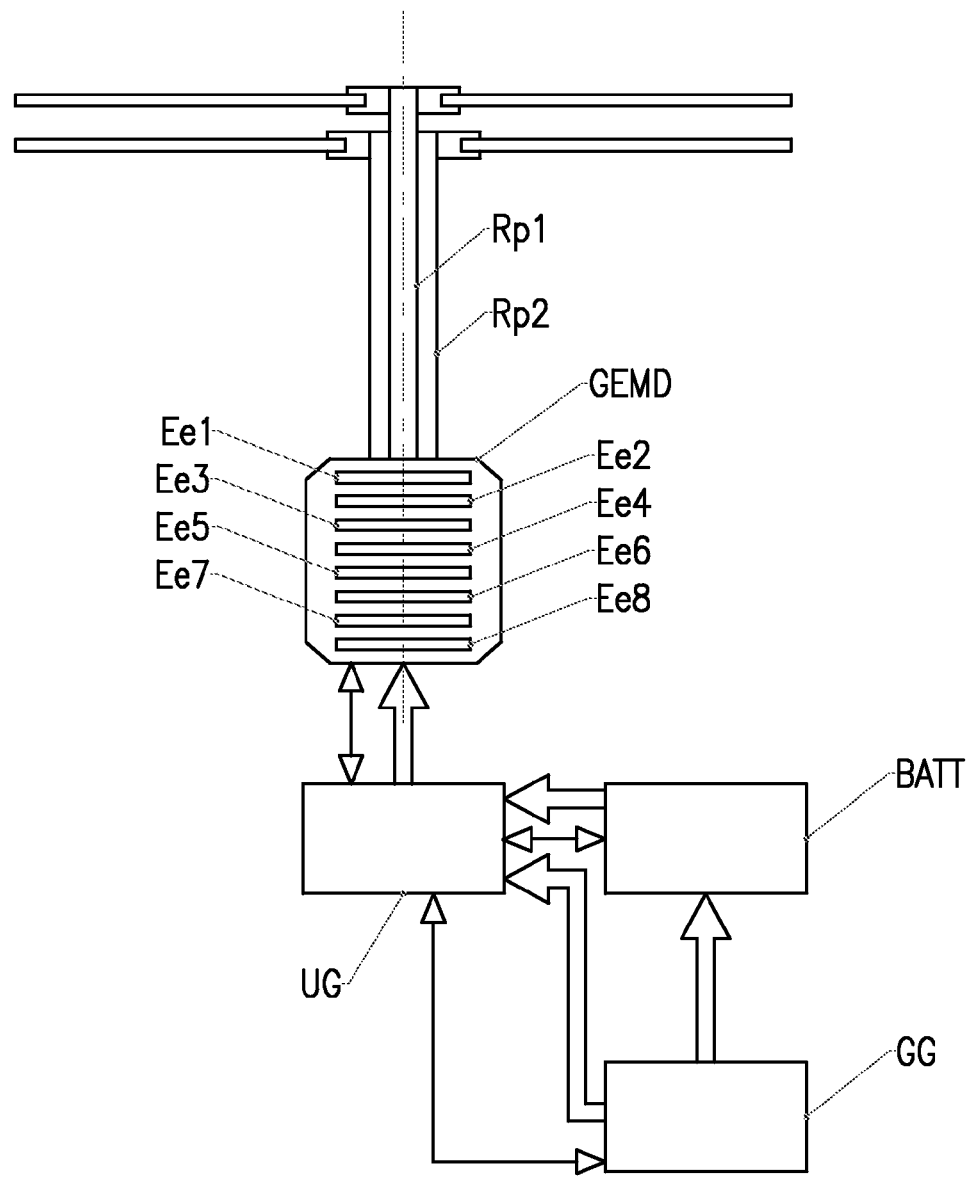
FIG. 1 depicts the arrangement of the propulsion device according to the invention for distributed propulsion on a helicopter with coaxial rotors.
Figure 4:
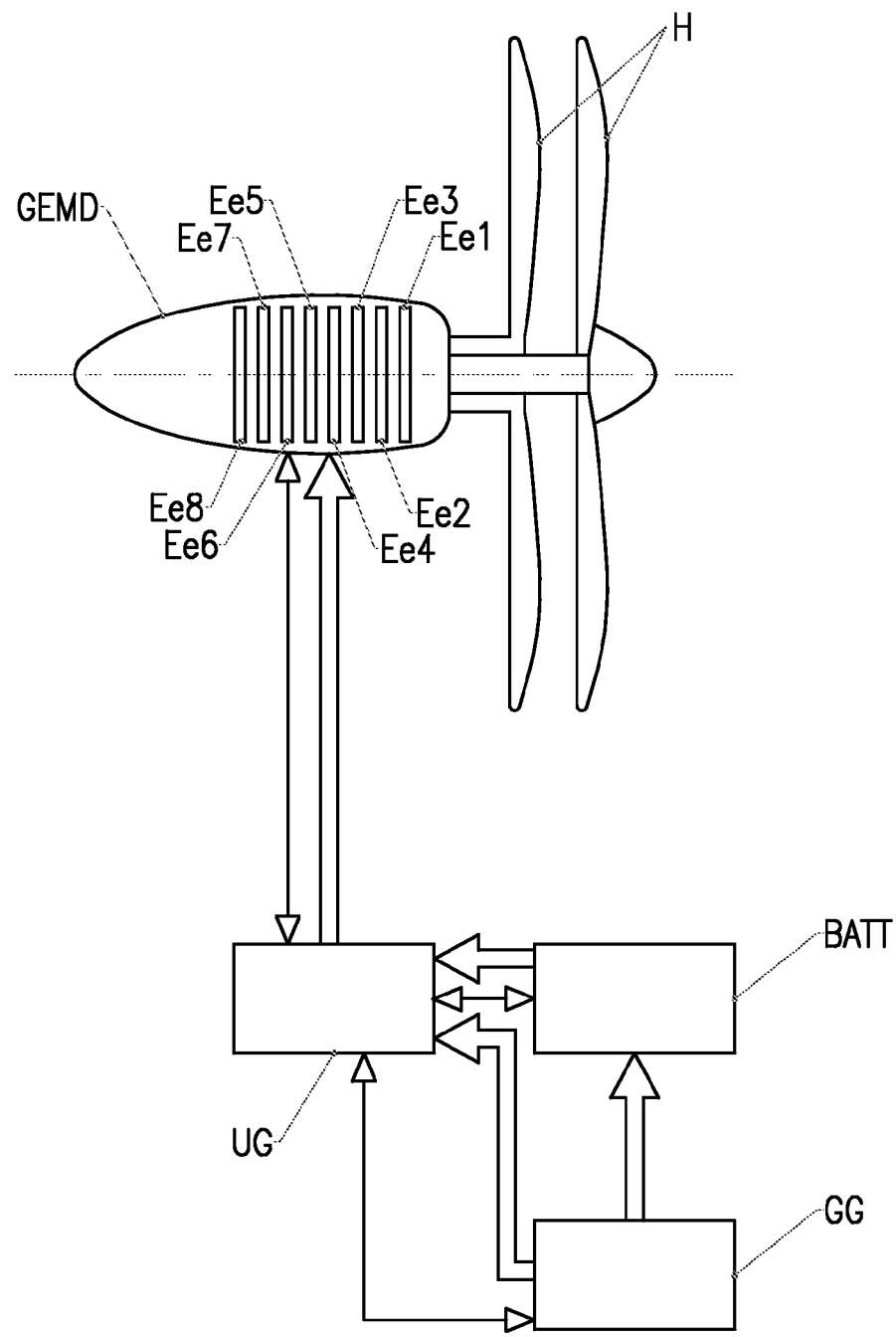
FIG. 4 depicts the arrangement of the propulsion device according to the invention for a distributed propulsion in a fixed-wing aircraft.

According to the invention, an electromagnetic transmission unit GEMD causes at least one rotor shaft to rotate at a variable or constant speed. In the example in FIG. 1, the electromagnetic transmission unit GEMD causes two coaxial rotors Rp1, Rp2 of a helicopter to rotate. In the example shown in FIGS. 2 and 3, an electromagnetic transmission unit GEMD1 causes the main rotor Rp of a helicopter to rotate, and another electromagnetic transmission unit GEMD2 causes the anti-torque tail rotor (RAC) to rotate. In the example shown in FIG. 4, the electromagnetic transmission unit GEMD causes the shafts on which coaxial airscrews H are mounted to rotate.

According to the invention, the electromagnetic transmission unit GEMD is a distributed electromagnetic transmission unit, that is to say it consists of a plurality of unitary electric motor elements Ee1, Ee2, . . . , Een, each being capable of producing a fraction of the total power necessary for causing the shaft Rp1, Rp2, Rp, RAC, H to rotate. The expression "electric motor element" is used in the context of the present invention to denote an entity capable of transforming electrical energy into mechanical energy. For example, this may be an electric motor integrating into its structure a fixed part (stator) and a moving part (rotor+freewheel). In practice, the stators comprise windings, and the rotors a plurality of magnetic poles. In order to optimize the physical size and the weight of the distributed electromagnetic transmission unit GEMD, the number of fixed parts (stator) may be different than or equal to the number of moving parts (rotor+freewheel). The distributed electromagnetic transmission unit GEMD for coaxial rotors or airscrews of the kind shown in FIGS. 1 and 4 may, for example, consist of electric motor elements each sharing common stators and two rotors with outputs on coaxial shafts.

Figure 5:
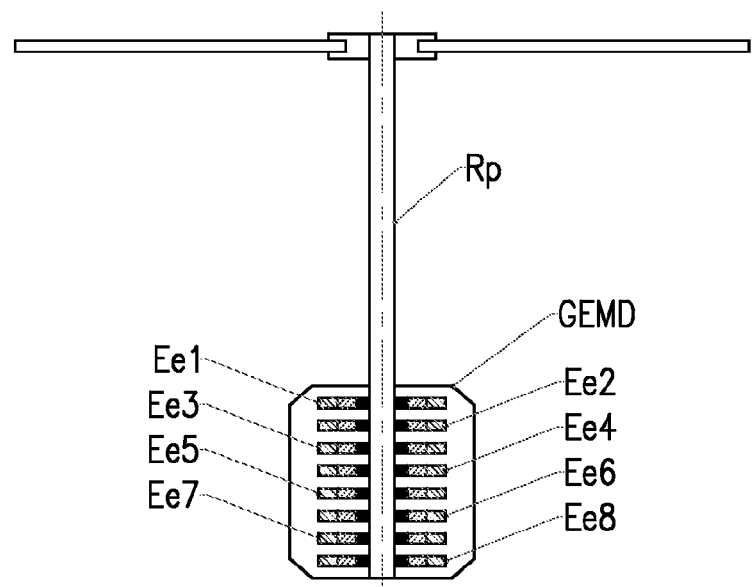
FIG. 5 depicts the connection of the distributed electromagnetic transmission unit according to the invention on the main rotor of a conventional helicopter.

The electric motor elements Ee1, Ee2, . . . , Een are stacked parallel one above the other (FIGS. 1 and 2), and/or side by side (FIGS. 3 and 4), in such a way as to obtain a multi-stage assembly. With particular reference to FIG. 5, these electric motor elements Ee1, Ee2, . . . , Een are integrated directly into the structure of the electromagnetic transmission unit GEMD. The latter is in direct engagement with the rotating shaft Rp1, Rp2, Rp, RAC, H, and no mechanism for the transmission of movement, in particular any form of angular gear unit or gearing, is interposed between said unit and said shaft.

Figure 6:
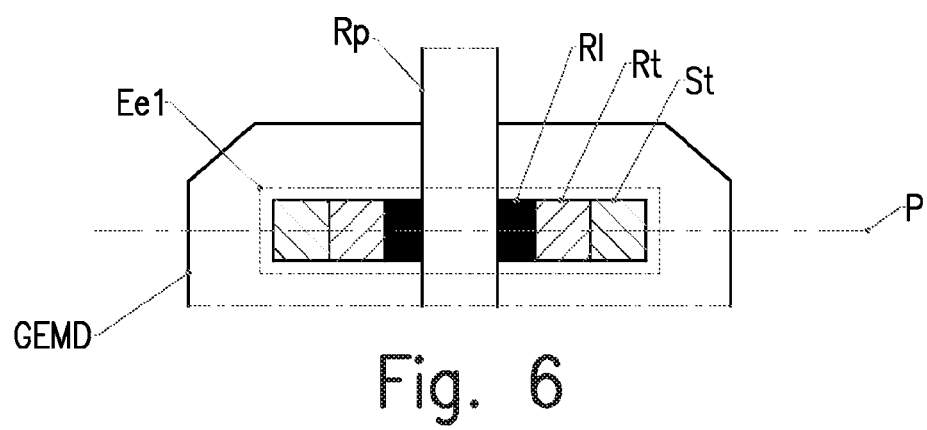
FIG. 6 is a view on an enlarged scale of FIG. 5 detailing one architecture of an electric motor element according to the invention.
Figure 7:
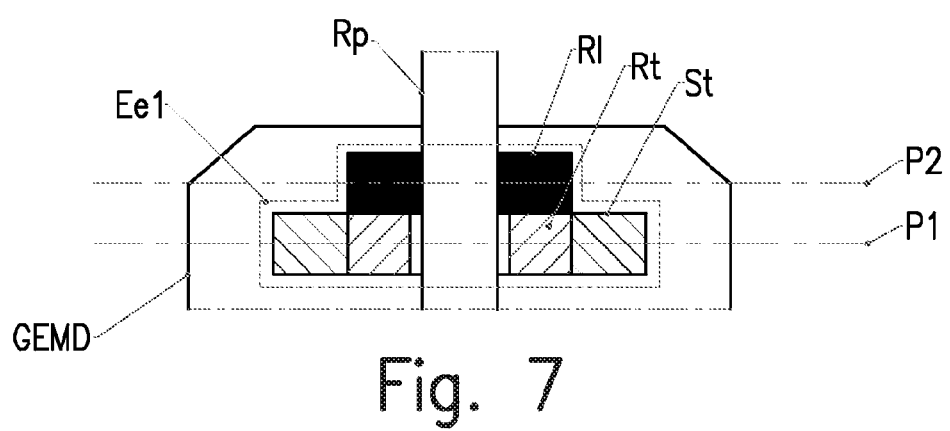
FIG. 7 is a view on an enlarged scale of FIG. 5 detailing another architecture of an electric motor element according to the invention.

With reference to FIGS. 5 to 7, each electric motor element Ee1, Ee2, . . . , Een is connected directly to the rotating shaft Rp1, Rp2, Rp, RAC, H and comprises at least one fixed stator St and at least one moving rotor Rt capable of being connected to said rotating shaft in order to transmit mechanical power to it. Each electric motor element Ee1, Ee2, . . . , Een preferably comprises at least one mechanical or electromagnetic freewheel RI. The latter is advantageously integrated directly into the structure of the electric motor elements Ee1, Ee2, . . . , Een. The freewheels RI are thus not arranged outside the distributed electromagnetic transmission unit GEMD, but are integrated directly into the latter, thereby reducing its physical size.

Each freewheel RI consists of one part in direct engagement with the moving rotor Rt and one part in direct engagement with the rotating shaft Rp1, Rp2, Rp, RAC, H. In the case of a mechanical freewheel, pawls, rolling elements or cams permit the temporary interruption of the rotating drive of the rotating shaft Rp1, Rp2, Rp, RAC, H, which can nevertheless continue to rotate freely. An electromagnetic freewheel consists of an induction motor which, in the absence of electrical excitation, permits the temporary interruption of the rotating drive of the rotating shaft Rp1, Rp2, Rp, RAC, H, while providing it with the possibility of rotating freely.

In normal operation, each moving rotor Rt is thus capable of cooperating with a freewheel RI in such a way as to be connected to the rotating shaft Rp1, Rp2, Rp, RAC, H, in order to transmit the mechanical power to it. On the other hand, in the event of the failure of an electric motor element Ee1, Ee2, ..., Een, the freewheel RI disconnects the rotor Rt from the rotating shaft Rp1, Rp2, Rp, RAC, H. This is particularly advantageous in the case of a short-circuit in a winding of the stator St that is capable of bringing about a very violent inductive braking of the rotor.

The freewheels RI may be situated in the same plane P as the moving rotor Rt with which they are associated (FIG. 6) or situated in another plane P1 parallel to the plane P2 of said rotor (FIG. 7). In the first case, the longitudinal physical size of the electromagnetic transmission unit GEMD is reduced. In the second case, the radial physical size of the electromagnetic transmission unit GEMD is reduced.

In the accompanying figures, the distributed electromagnetic transmission unit GEMD is composed of eight electric motor elements (n=8), although a larger or smaller number may be provided according to the total power which must be produced and/or according to the unit power output of each element. The total generated power may vary from a few kilowatts (for example, in order to cause a tail rotor to rotate) to several thousands of kilowatts (for example, in order to cause the system of propulsion system of an airplane with coaxial airscrews and/or rotors to rotate).

In order to avoid any over-sizing of the electromagnetic transmission unit GEMD, which would have a detrimental effect by increasing the onboard weight of the aircraft, the electric motor elements are not able, under any circumstances, to provide on their own the power necessary for the propulsion and/or lifting of said aircraft. On the other hand, each electric motor element Ee1, Ee2, ..., Een produces, on the rotating shaft Rp1, Rp2, Rp, RAC, H, a mechanical power of the following kind:

$$Pr = \sum_{i=1}^{n} K_i \cdot P_{im}$$

where:
Pr represents the nominal mechanical power necessary for the propulsion and/or lifting of said aircraft,
Pim represents the maximum mechanical power capable of being delivered by the electric motor element of rank i, to the rotating shaft Rp1, Rp2, Rp, RAC, H, with Pim<Pr,
Ki represents the power derating of the electric motor element of rank i, such that 0<ki<1, Ki being a variable that is adjustable according to the valid number of electric motor elements and/or according to the nominal mechanical power Pr necessary for the propulsion and/or lifting of said aircraft at a time t,
n represents the number of valid electric motor elements making up the electromagnetic transmission unit GEMD, such that n≥2, and preferably n=5, vibrations being greatly limited in the electromagnetic transmission motor unit for this number of electric motor elements.

More specifically, the electric motor elements Ee1, Ee2, ..., Een are sized in such a way that the minimum number "Nmin" of said elements that are together capable of delivering the nominal mechanical power Pr necessary for the propulsion and/or lifting of said aircraft is such that Nmin≥2. An electric motor element is therefore incapable on its own of supplying the nominal mechanical power Pr in a manner that is consistent with the weight and power constraints required by an aircraft.

All or some of the electric motor elements Ee1, Ee2, ..., Een may be sized so as each to deliver a different maximum mechanical power Pim to the rotating shaft Rp1, Rp2, Rp, RAC, H. It is possible, for example, to arrange those electric motor elements that are capable of delivering the highest levels of mechanical power at one end of the electromagnetic transmission unit GEMD, and to arrange those electric motor elements delivering the lowest levels of mechanical power at the other end. This "conical" configuration ensures better cooling of the electric motor elements Ee1, Ee2, ..., Een. In this case, the power derating factors Ki are different for each of said electric motor elements Ee1, Ee2, ..., Een.

All of the electric motor elements can be sized, however, so as each to deliver an identical maximum mechanical power Pim to the rotating shaft Rp1, Rp2, Rp, RAC, H. A "cylindrical" configuration is then obtained, in which the distribution of the mechanical powers is homogeneous on the rotating shaft Rp1, Rp2, Rp, RAC, H. In this case, the derating factors Ki are identical for each of said electric motor elements.

The maximum power PM capable of being developed on the rotating shaft Rp1, Rp2, Rp, RAC, H is:

$$PM = \sum_{i=1}^{n} P_{im}$$

The power margin $P_f$ (>1) is expressed in the form:

$$P_f = \frac{P_{1m} + P_{2m} + P_{3m} + P_{4m} + \ldots + P_{nm}}{k_1 \cdot P_{1m} + k_2 \cdot P_{2m} + k_3 \cdot P_{3m} + k_4 \cdot P_{4m} + \ldots + k_n \cdot P_{nm}}$$

For the specific case in which all the electric motor elements Ee1, Ee2, ..., Een are identical, given that K1=K2= ... =Kn=K We obtain:

$$P_f = \frac{1}{k}$$

The maximum number "Nm" of electric motor elements Ee1, Ee2, ..., Een that are able to fail without a reduction in the nominal power Pr on the rotating shaft Rp1, Rp2, Rp, RAC, H is:

$$N_m = \frac{(P_{1m} + P_{2m} + P_{3m} + P_{4m} + \ldots + P_{nm}) - k \cdot (P_{1m} + P_{2m} + P_{3m} + P_{4m} + \ldots + P_{nm})}{P_{nm}}$$

$$= \frac{P_r \cdot (P_f - 1)}{P_{nm}}$$

where Nm is a natural integer other than zero.

The electric motor elements Ee1, Ee2, ..., Een may be physically separated and insulated (mechanical segregation) and/or electrically separated and insulated (electrical segregation) from one another. For mechanical segregation, each electric motor element may, for example, be inserted into a dedicated housing (or box or casing). For electrical segregation, it is possible to provide, for example, one or a plurality of discrete windings on the same ferromagnetic core. This type of segregation, for example, offers the distributed electromagnetic transmission unit GEMD sure resilience to the effects of subsequent damage caused by fires capable of affecting an electric motor element.

The distributed electromagnetic transmission unit GEMD is controlled by an electronic control unit UG. The latter consists of a more or less complex electronics system, typically equipped with one or a plurality of digital or analogue processors configured to execute one or more programs, sub-programs, microprograms or all other equivalent types of software, in order to control the operation of the distributed electromagnetic transmission motor unit GEMD and, in a more general manner, that of the device that is the subject matter of the invention. In particular, the control unit UG enables the electric motor elements Ee1, Ee2, ..., Een to be synchronized with one another.

The control unit UG is preferably associated with a means for the continuous monitoring of the integrity of each electric motor element Ee1, Ee2, ..., Een. The control means may, for example, consist of a set of sensors integrated in an intrinsic manner into each electric motor element and, for example, configured to detect the rotation and the angle of the rotor, the supply of electricity to the stator, the torque and/or the generated power, etc. In the event of the failure of one or a plurality of initially active electric motor elements Ee1, Ee2, ..., Een, the control unit UG is then configured to emit an instruction enabling the power delivered by all of said elements to be reconfigured in real time. For example, during normal operation, only some of the electric motor elements (for example: Ee1 to Ee6) may be sufficient to transmit the necessary power to the rotating shaft Rp1, Rp2, Rp, RAC, H. In the event of the failure of electric motor elements (for example: Ee5 and Ee6), the control unit UG instantaneously brings into service other reserve electric motor elements (for example: Ee7 and Ee8) so that the distributed electromagnetic transmission unit GEMD can continue to transmit sufficient power to the rotating shaft Rp1, Rp2, Rp, RAC, H.

In the event of the failure of one or a plurality of initially active electric motor elements Ee1, Ee2, ..., Een, the control unit UG is preferably configured to emit an instruction, intended for the other valid electric motor elements, enabling the power delivered by each of said valid electric motor elements to be reconfigured in a linear fashion in real time by modifying the variable "Ki" in such a way that the distributed electromagnetic transmission unit GEMD continues to transmit sufficient power to the rotating shaft Rp1, Rp2, Rp, RAC, H. For example, in normal operation, all of the electric motor elements (for example: Ee1 to Ee8) each provide a fraction of their maximum power in such a way that the distributed electromagnetic transmission unit transmits nominal power to the rotating shaft Rp1, Rp2, Rp, RAC, H. In the event of the failure of electric motor elements (for example: Ee5 and Ee6), the control unit UG reconfigures the power delivered by each electric motor element that is still valid (for example: Ee1, Ee2, Ee3, Ee4, Ee7 and Ee8) by increasing the derating value Ki so that the distributed electromagnetic transmission unit GEMD can continue to transmit sufficient power to the rotating shaft Rp1, Rp2, Rp, RAC, H. In the event of eight electric motor elements having been brought into service initially and two electric motor elements becoming defective, the six electric motor elements still valid will deliver 1.33 times the power that they would have supplied prior to the failure. Furthermore, it is possible to modulate the distribution of the power on each electric motor element Ee1, Ee2, ..., Een in order to optimize the thermal efficiency and dissipation. The electric motor elements Ee1, Ee2, ..., Een are not necessarily all of the same size, and they do not necessarily supply the same power.

The electromagnetic transmission unit GEMD thus has a structure which is distributed, self-adjusting and, in the case of aircraft, configurable in flight, thereby providing high resilience to multiple failures as well as to the effects of subsequent damage caused by multiple ballistic impacts or by fires.

The control unit UG controls the operating point of the distributed electromagnetic transmission unit GEMD according to the power requirement of the aircraft. In particular, the control unit UG can cause the torque or the speed of rotation of each electric motor element Ee1, Ee2, ..., Een to vary according to the power requirement of the aircraft. For example, in the event of the failure of electric motor elements, and if no other reserve electric motor element is available, the control unit UG can emit an instruction in order to increase the torque or the speed of rotation of those electric motor elements that are still in service, so that the distributed electromagnetic transmission unit GEMD can continue to transmit sufficient power to the rotating shaft Rp1, Rp2, Rp, RAC, H.

With reference to the accompanying figures, the aircraft comprises an energy generation unit GG that is used to produce electrical energy. This generation unit GG may be composed of a thermochemical generator, a thermoelectric generator (Peltier or other), a radio-isotopic (nuclear) generator, fuel cells, a turboshaft engine or an internal combustion engine equipped with an internal electrical generator or driving an external generator. Typically, this energy generation unit GG is associated with a means for distributing the electrical energy produced. This means may consist of a more or less complex electronics system, optionally controlled by the control unit UG.

The electrical energy produced by the generation unit GG may be stored temporarily in a storage means BATT. In practice, the latter may consist of a set of batteries and/or supercapacitors and/or any other similar means (inertia flywheels on magnetic bearings, for example) having their own system of electronic control and regulation. Supercapacitors are capacitors with exceptionally high capacitances, typically above a hundred or even thousands of farads. These components owe their existence to recent discoveries of materials with high dielectric constants. Unlike a battery, a supercapacitor is able to supply very high intensities very quickly. In the case of a helicopter, during the autorotation phase, the distributed electromagnetic transmission unit GEMD can function as a generator, thereby enabling the batteries and/or supercapacitors to be recharged while regulating the speed of rotation of the main rotor or rotors Rp1, Rp2, Rp.

A power controller either integrated in or operated by the control unit UG controls the supply of electrical energy to the electromagnetic transmission unit GEMD. This electrical energy may originate from a storage means BATT and/or from the generation unit GG. The control unit UG is thus configured to manage the supply to the distributed electromagnetic transmission unit GEMD via the power controller. In practice, the control unit UG comprises a program containing instructions for supplying the distributed electromagnetic transmission unit GEMD:

- either solely with the electrical energy produced by the generation unit GG (some of this electrical energy may or may not be directed simultaneously to the storage means BATT);
- or solely with the electrical energy stored in the storage means BATT;
- or by combining the electrical energy produced by the generation unit GG with the electrical energy stored in the storage means BATT (in order to respond to the transient high demands for power, for example during the take-off phase). This combination leads to a significant reduction in the weight of the propulsion system compared with a conventional aircraft.

The generation unit GG is preferably associated with a means for controlling its operating state. In practice, it is in the form of one or a plurality of sensors integrated in said unit and permitting the continuous control of various operating parameters. If the generation unit GG is faulty or defective as a result of mechanical, incendiary and/or ballistic damage, the control unit GG will instantaneously emit instructions for supplying the electromagnetic transmission unit GEMD with the electrical energy stored in the storage means BATT. In the case of a helicopter, in the event of failure of the generation unit GG, the energy stored in the storage means BATT may thus permit a powered landing and the possibility of hovering, unlike helicopters equipped with conventional propulsion systems. The engine failure and resulting autorotation is no longer an emergency.

The generation unit GG may give off a certain quantity of heat in certain cases (in particular in the case in which it comprises an internal combustion engine), in fact creating an infrared signature for the aircraft or the machinery, which are detectable by standard methods of spectral analysis. In order to adopt stealth mode (with no infrared signature, an indispensable stealth component on a battlefield), the control unit UG is adapted to emit instructions for supplying the distributed electromagnetic transmission unit GEMD solely with the electrical energy stored in the storage means BATT, and instructions for simultaneously stopping the operation of the generation unit GG.

The invention claimed is:

1. A rotary- or fixed-wing aircraft comprising one or a plurality of rotors and/or one or a plurality of airscrews, the one or more rotors and/or the one or more airscrews being caused to rotate at a variable or constant speed by a shaft, said aircraft comprising an electromagnetic transmission unit configured to ensure the propulsion and/or the lifting of the said aircraft by causing said shaft to rotate
characterized by the fact that:
the transmission unit is a distributed electromagnetic transmission unit composed of a plurality of stacked electric motor elements, each said element being able to produce, on the rotating shaft, a fraction of the total power required for the propulsion and/or the lift of said aircraft,
the electromagnetic transmission unit is directly connected to the rotating shaft, without any movement transmission mechanism between said unit and said shaft,
each electric motor element is connected directly to the rotating shaft and comprises a fixed stator, a moving rotor and mechanical or electromagnetic freewheeling unit directly connected to said rotating shaft, said moving rotor cooperating with said freewheeling unit in such way as to be coupled to said rotating shaft during normal operation of the electric motor element and to decouple from said shaft when said electric motor element fails,
the axes of rotation of the moving rotors, freewheeling units and rotating shaft are coaxial.

2. An aircraft according to claim 1, wherein each freewheeling unit is situated in the same plane as the moving rotor with which it is associated.

3. An aircraft according to claim 1, wherein the electric motor elements are physically separated and insulated from one another, each said electric motor element being inserted in a dedicated housing.

4. An aircraft according to claim 1, wherein the stack of electric motor elements comprises a number of fixed stators different than or equal to the number of moving rotors.

5. An aircraft according to claim 1, wherein an electronic control unit is associated with a means for continuously monitoring the integrity of each electric motor element.

6. An aircraft according to claim 5, wherein, in the event of the failure of one or a plurality of electric motor elements, the electronic control unit is configured to emit an instruction making it possible to:
reconfigure in real time all the electric motor elements by adding, if necessary, one or more reserve electric motor elements,
or reconfigure in real time the power delivered by each electric motor element so that the distributed electromagnetic transmission unit continues to transmit sufficient power to the rotating shaft.

7. An aircraft according to claim 1, comprising:
an energy generation unit intended to produce electrical energy, the said unit being associated with a means for distributing the said energy,
a means for storing the electrical energy produced by the generation unit,
the distributed electromagnetic transmission unit being supplied with electrical energy via a power controller:
by the means for storing electrical energy,
and/or by the generation unit.

8. An aircraft according to claim 7, wherein the electrical energy storage means is composed of a set of batteries and/or supercapacitors.

9. An aircraft according to claim 7, wherein the electrical energy generation unit is composed of a thermochemical generator, or a thermoelectric generator, or a radio-isotopic generator, or fuel cells, or a turboshaft engine or an internal combustion engine equipped with an internal generator or operating an external generator.

10. An aircraft according to claim 7, wherein an electronic control unit is configured to control the operating point of the distributed electromagnetic transmission unit according to the power requirement of said aircraft.

11. An aircraft according to claim 7, comprising an electronic control unit configured to control the supply to the distributed electromagnetic transmission unit, said unit comprising a program containing:
instructions for supplying the distributed electromagnetic transmission unit solely with the electrical energy produced by the generation unit,
instructions for supplying the distributed electromagnetic transmission unit solely with the electrical energy stored in the storage means,
instructions for supplying the distributed electromagnetic transmission unit by combining the electrical energy produced by the generation unit with the electrical energy stored in the storage means.

12. An aircraft according to claim 7, comprising:
a means for controlling the operating state of the generation unit,
an electronic control unit configured to control the supply to the distributed electromagnetic transmission unit, said unit comprising a program containing instructions for supplying said distributed electromagnetic transmission unit solely with the electrical energy stored in the storage means, in the event of the failure of the generation unit.

13. An aircraft according to claim 7, comprising an electronic control unit configured to control the supply of the distributed electromagnetic transmission unit, said unit comprising a program containing instructions for supplying said electromagnetic transmission unit solely with the electrical energy stored in the storage means, and instructions for simultaneously stopping the function of the generation unit.

* * * * *